(12) United States Patent  (10) Patent No.: US 7,907,981 B2
Baek  (45) Date of Patent: Mar. 15, 2011

(54) SLIDE TYPE MOBILE COMMUNICATION TERMINAL

(75) Inventor: Nam Young Baek, Seoul (KR)

(73) Assignee: Nam Young Baek, Seoul (KR)

( * ) Notice: Subject to any disclaimer, the term of this patent is extended or adjusted under 35 U.S.C. 154(b) by 443 days.

(21) Appl. No.: 11/573,189

(22) PCT Filed: Aug. 5, 2005

(86) PCT No.: PCT/KR2005/002548
§ 371 (c)(1),
(2), (4) Date: Feb. 2, 2007

(87) PCT Pub. No.: WO2006/014088
PCT Pub. Date: Feb. 9, 2006

(65) Prior Publication Data
US 2008/0002343 A1  Jan. 3, 2008

(30) Foreign Application Priority Data
Aug. 5, 2004 (KR) .................... 20-2004-0022433 U (51) Int. Cl.
*H05K 5/00* (2006.01)
(52) U.S. Cl. ............. 455/575.4; 455/575.1; 361/679.39; 361/727; 345/169; 345/905
(58) Field of Classification Search .............. 455/575.1, 455/575.3–4, 575.4; 361/679.39, 727; 345/169, 345/173, 905
See application file for complete search history.

(56) References Cited

U.S. PATENT DOCUMENTS

| 6,748,242 | B1 * | 6/2004 | Dunleavy ....................... 455/566 |
| 6,801,796 | B2 * | 10/2004 | Finke-Anlauff ........... 455/575.3 |
| 7,003,104 | B2 * | 2/2006 | Lee ........................... 379/433.13 |
| 7,003,318 | B2 * | 2/2006 | Kota et al. .................... 455/556.1 |
| 7,099,708 | B2 * | 8/2006 | Ronkko ..................... 455/575.1 |
| D533,531 | S * | 12/2006 | Hyun et al. ........... D14/138 AD |
| 7,187,363 | B2 * | 3/2007 | Nguyen et al. ................ 345/168 |
| D542,758 | S * | 5/2007 | Kim et al. ............. D14/138 AA |
| 7,269,450 | B2 * | 9/2007 | Lee et al. .................... 455/575.1 |
| 7,363,065 | B2 * | 4/2008 | Lee ............................. 455/575.3 |
| 2003/0013417 | A1 * | 1/2003 | Bum ................................ 455/90 |
| 2003/0073414 | A1 * | 4/2003 | Capps ............................. 455/90 |

(Continued)

FOREIGN PATENT DOCUMENTS

| KR | 1020040003257 | 1/2004 |
| KR | 1020040025624 | 3/2004 |
| KR | 1020040031583 | 4/2004 |

*Primary Examiner* — Jinsong Hu
*Assistant Examiner* — Qun Shen
(74) *Attorney, Agent, or Firm* — IP & T Group LLP (57) ABSTRACT

Disclosed is a slide type mobile communication terminal. The terminal comprises an upper main body having a display section and a first function key pad section; a lower main body connected to the upper main body to be slidable upward and downward relative to the upper main body and having an input key pad section and a second function key pad section on lower and upper parts of the lower main body; and a slide engagement member having a slide rail provided to one of the upper and lower main bodies and extending over about a whole length of an upstream and downstream direction of the main body and a slide protrusion located at a middle point of an upstream and downstream direction of the other main body and inserted into the slide rail, and connecting the upper and lower main bodies to be slidable.

8 Claims, 6 Drawing Sheets

U.S. PATENT DOCUMENTS

| | | | |
|---|---|---|---|
| 2005/0049019 A1* | 3/2005 | Lee | 455/575.4 |
| 2005/0113155 A1* | 5/2005 | Kim et al. | 455/575.4 |
| 2005/0130720 A1* | 6/2005 | Finke-Anlauff | 455/575.3 |
| 2005/0191969 A1* | 9/2005 | Mousseau | 455/90.2 |
| 2005/0272487 A1* | 12/2005 | Lee | 455/575.4 |
| 2006/0009255 A1* | 1/2006 | Vuolteenaho | 455/556.1 |
| 2006/0154705 A1* | 7/2006 | Kim | 455/575.4 |

\* cited by examiner

SLIDE TYPE MOBILE COMMUNICATION TERMINAL

TECHNICAL FIELD

The invention relates to a mobile communication terminal, and more particularly to a slide type mobile communication terminal capable of switching a stand-by mode into communication and specific function modes by allowing a part of a terminal main body to be slidingly moved upward and downward.

BACKGROUND ART

In recent years, as mobile communication technologies have made rapid progress, personal mobile communication devices including a mobile communication terminal have been widely spread as individual daily necessaries.

Among them, a mobile communication terminal is the most popular digital multimedia device having integrated functions of information devices such as PDA as well as a variety of audio/video (A/V) devices such as MP3, digital camera, camcorder, TV and the like.

Further, applications of the mobile communication terminal are infinite as integrations of hard disk drive (HDD), wireless LAN, Bluetooth, fingerprint identification, radio equipment, digital multimedia broadcasting (DMB), game machine and the like with the terminal.

In order to embody such diverse supplementary functions, it is required a design for an operating method of the mobile communication terminal allowing each of the supplementary functions to be easily switched into an operating mode and to be efficiently operated.

The mobile communication terminal can be classified into bar, flip, folder, slide types and the like. The slide type terminal is advantageous to entertainment environments such as game and diverse multimedia environments such as digital multimedia broadcasting, camera, moving picture and the like.

For example, a slide type mobile communication terminal generally comprise upper and lower main bodies wherein the main bodies are respectively formed with a slide recess and a protrusion and the terminal is switched into a communication mode only when the upper main body is slid upward relative to the lower main body. An example of the slide type mobile communication terminal is disclosed in Korean patent publication No. 10-2002-0052542.

However, according to the slide type mobile communication terminal, since the upper main body is just able to move upward and return to its original position relative to the lower main body when the terminal is switched between the normal stand-by mode and the communication mode, a usable space of the terminal for allotting the functions is limited to an upper surface of the upper main body and a downstream keypad section of an upper surface of the lower main body, which the keypad section is exposed when the upper main body is slid upward. Accordingly, there is limitation in arrangements of structures for embodying the multimedia supplementary functions such as game, DMB, camera, moving picture and the like.

DISCLOSURE OF INVENTION

Technical Problem

Accordingly, the present invention has been made to solve the above problems. An object of the invention is to provide a slide type mobile communication terminal allowing an upper main body to slide upward and downward relative to a lower main body so as to easily embody a variety of game and multimedia functions.

Another object of the invention is to provide an arrangement capable of easily performing supplementary functions such as game to a slide type mobile communication terminal by allowing an upper main body to slide downward relative to a lower main body and thus providing a usable space for embodying the supplementary functions of the terminal to the lower main body.

Technical Solution

In order to achieve the above objects, there is provided a slide type mobile communication terminal comprising: an upper main body having a display section and a first function key pad section; a lower main body connected to the upper main body to be slidable upward and downward relative to the upper main body and having an input key pad section and a second function key pad section on lower and upper parts of the lower main body; and a slide engagement member having a slide rail provided to one of the upper and lower main bodies and extending over about a whole length of an upstream and downstream direction of the main body and a slide protrusion located at a middle point of an upstream and downstream direction of the other main body and inserted into the slide rail, and connecting the upper and lower main bodies to be slidable.

According to an embodiment of the invention, the second function key pad section may be located at an upstream part of the lower main body opposite to the first function key pad section so that it is exposed to an exterior when the upper main body is slid downstream relative to the lower main body.

According to an embodiment of the invention, fixing elements for local engagement with the slide protrusion may be formed at upstream, middle and downstream portions of the slide rail, respectively.

According to an embodiment of the invention, when the slide protrusion is engaged with the upstream fixing element of the slide rail, the display section may be located at a center of the mobile communication terminal.

According to an embodiment of the invention, the first and second function key pad sections may comprise at least one of a selection key and directions keys.

According to an embodiment of the invention, a digital camera module section may be further provided to a side of one of an upstream part of the upper main body and the upstream part of the lower main body.

According to an embodiment of the invention, the upper and lower main bodies may be under stand-by mode in an initial position and when the upper main body is slid upstream and downstream relative to the lower main body, the terminal may be switched into communication and supplementary function modes, respectively.

According to an embodiment of the invention, the supplementary function mode may be one of game, DMB and camera modes.

According to an embodiment of the invention, when the supplementary function is selected as the game mode, all the first and second function key pad sections may be activated as game function keys.

According to an embodiment of the invention, when the supplementary function is selected as the game, camera or DMB mode, the display section may be switched into a horizontal wide screen arrangement.

Advantageous Effects

According to the invention, the slide type mobile communication terminal has such structure that the upper main body can slide upward and downward relative to the lower main body and the first and second function key pad sections related to the supplementary functions provided to the terminal are arranged on downstream and upstream parts of the upper and lower main bodies. Accordingly, when a user selects the supplementary functions such as game, camera, DMB and the like, the user can use the first and second function key pad sections with the display section being located at the center. Therefore, the user can manipulate the function keys with both hands while seeing the display screen, under state that the terminal is horizontally arranged and both ends of the terminal are held by both hands.

BRIEF DESCRIPTION OF THE DRAWINGS

The above and other objects, features and advantages of the present invention will be more apparent from the following detailed description taken in conjunction with the accompanying drawings, in which.

BEST MODE FOR CARRYING OUT THE INVENTION

Hereinafter, preferred embodiments of the present invention will be described with reference to the accompanying drawings. In the following descriptions of the present invention, a detailed description of known functions and configurations incorporated herein will be omitted when it may make the subject matter of the present invention rather unclear.

Figure 1:
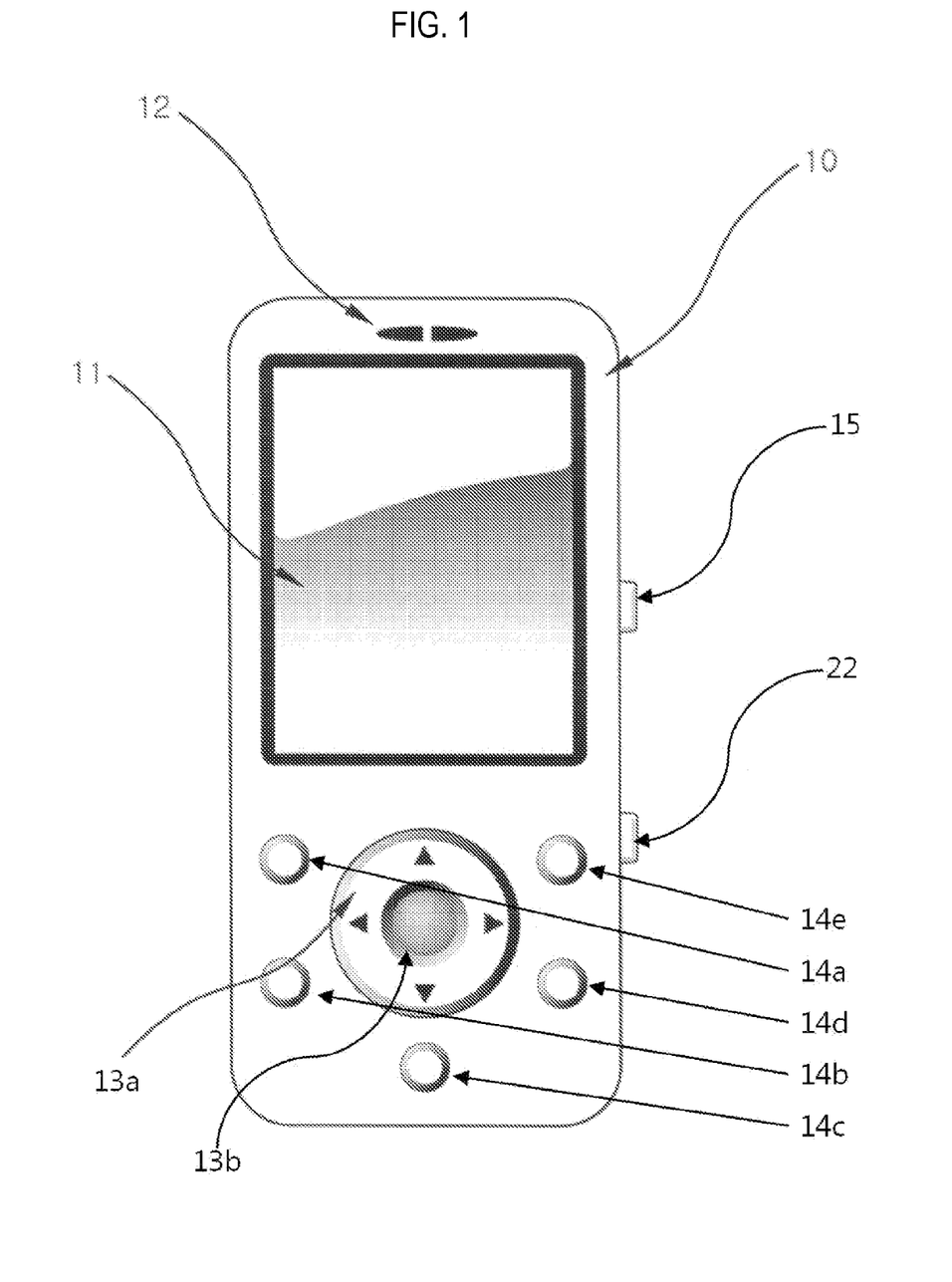
FIG. 1 is a front view of a slide type mobile communication terminal under stand-by mode according to an embodiment of the invention.
Figure 2:
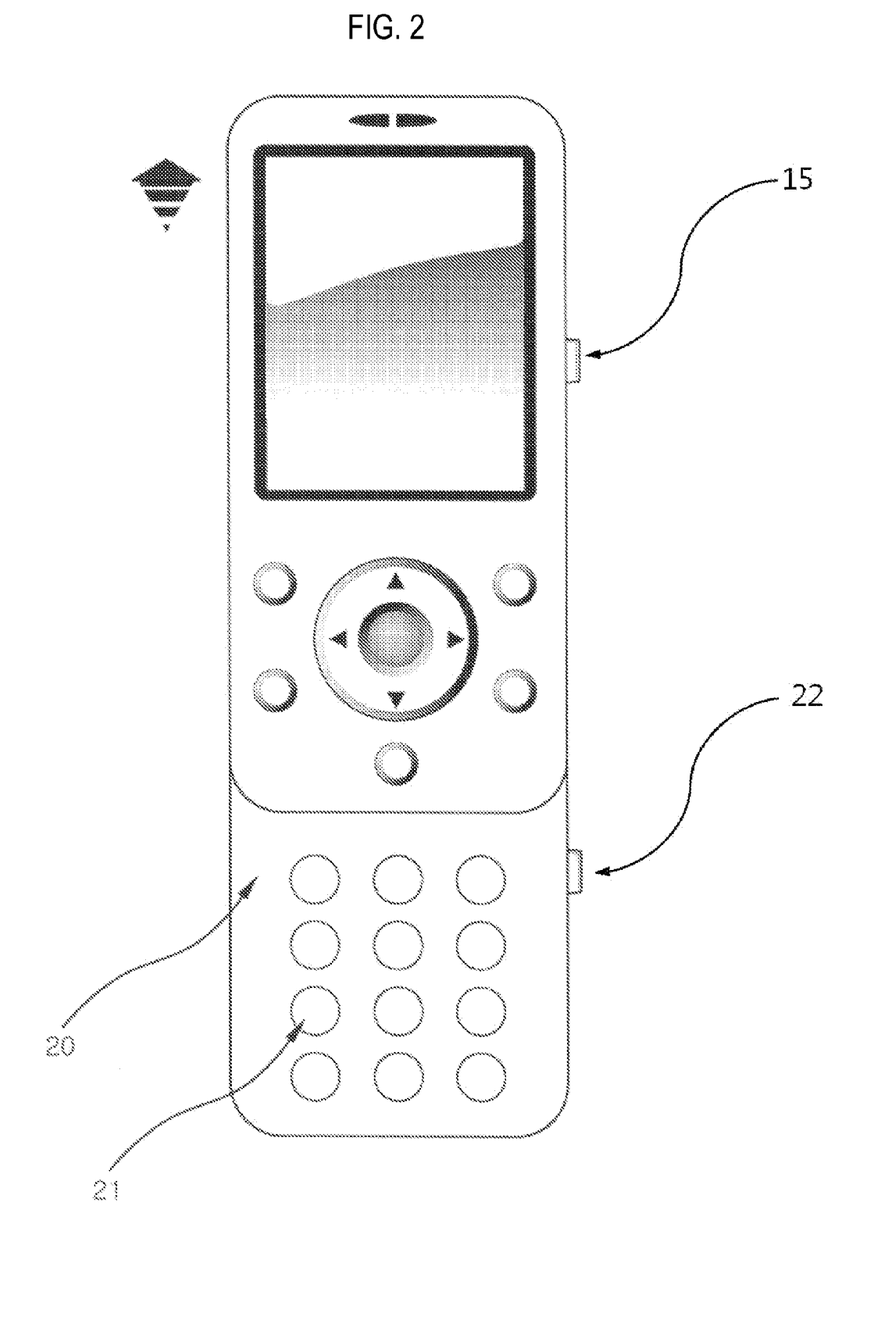
FIG. 2 is a front view of a slide type mobile communication terminal under communication mode, in which an upper main body of the terminal is slid upward relative to a lower main body, according to an embodiment of the invention.
Figure 3:
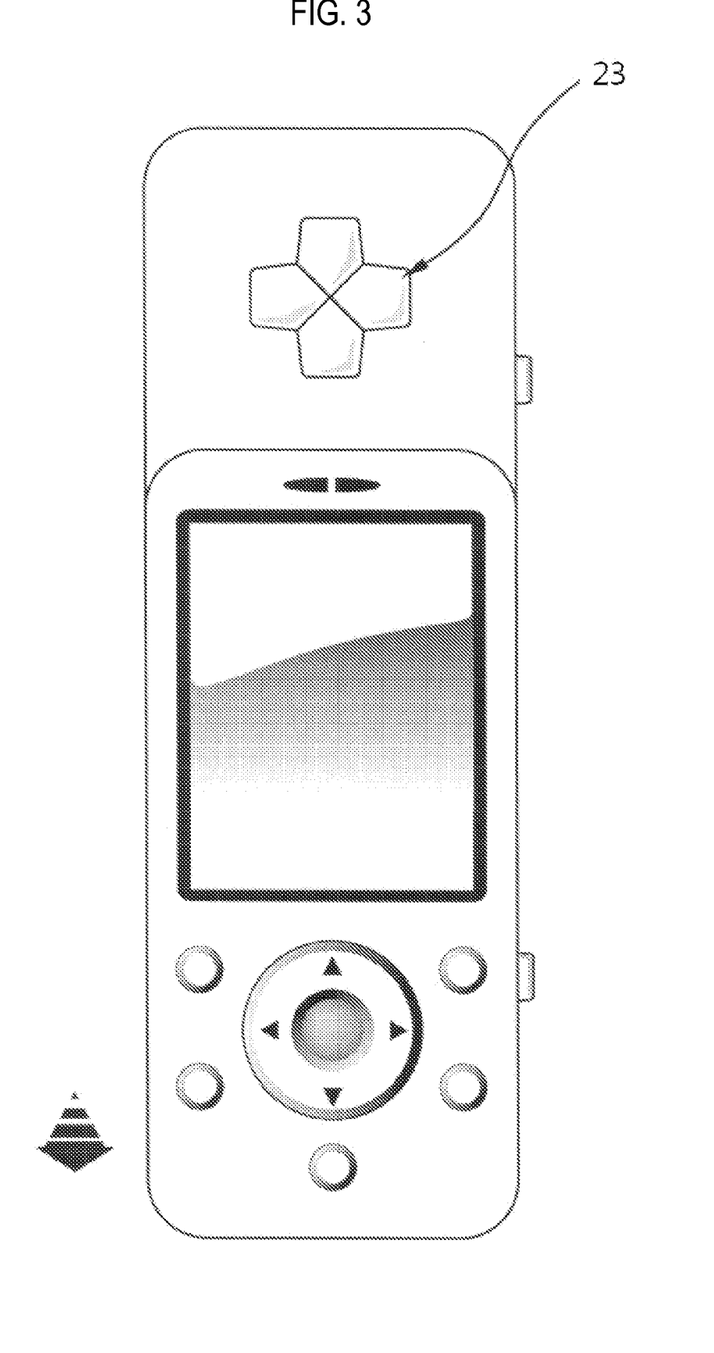
FIG. 3 is a front view of a slide type mobile communication terminal under supplementary function mode, in which an upper main body of the terminal is slid downward relative to a lower main body, according to an embodiment of the invention.
Figure 4:
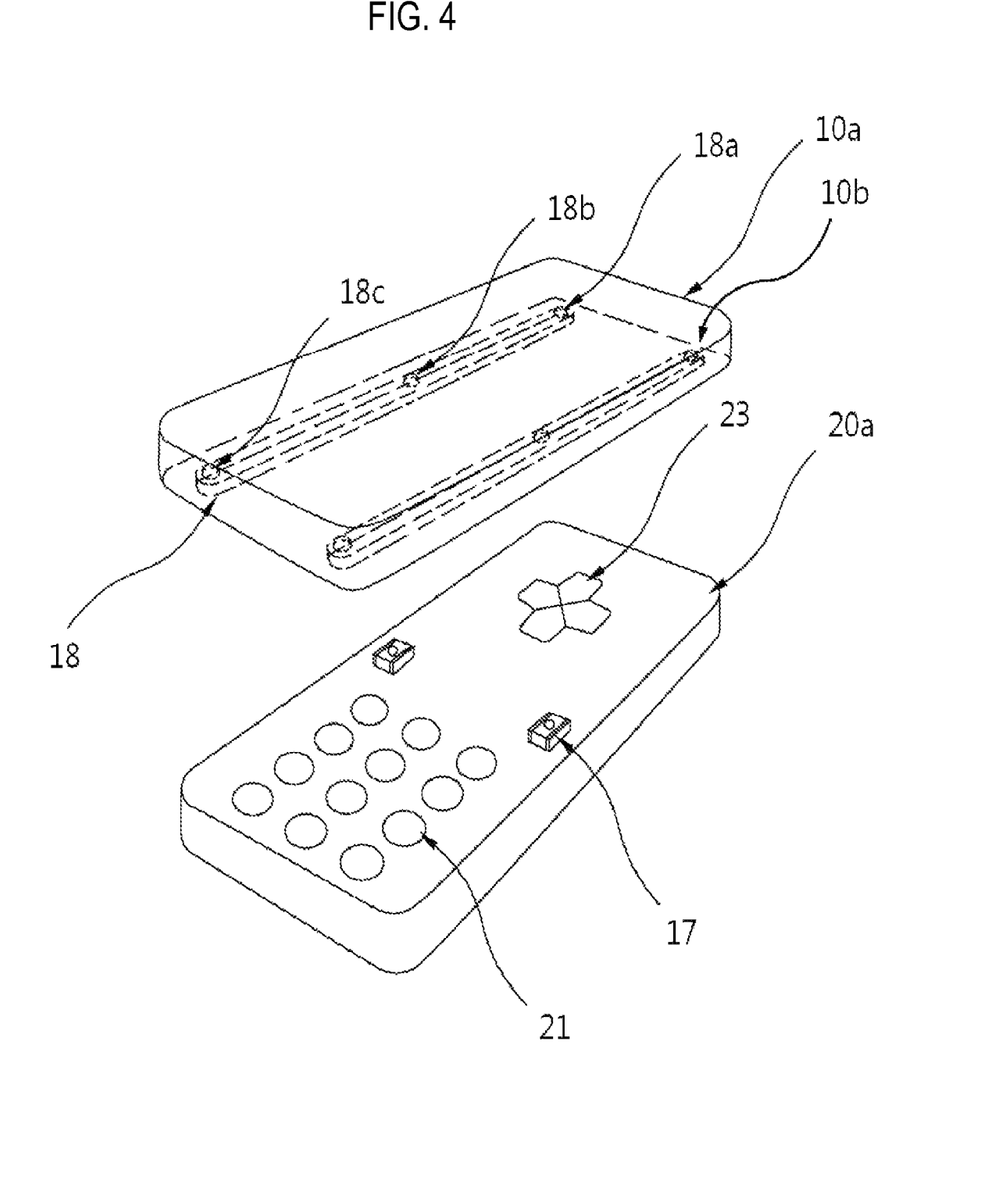
FIG. 4 is a schematic exploded perspective view of a slide type mobile communication terminal according to an embodiment of the invention.
Figure 5:
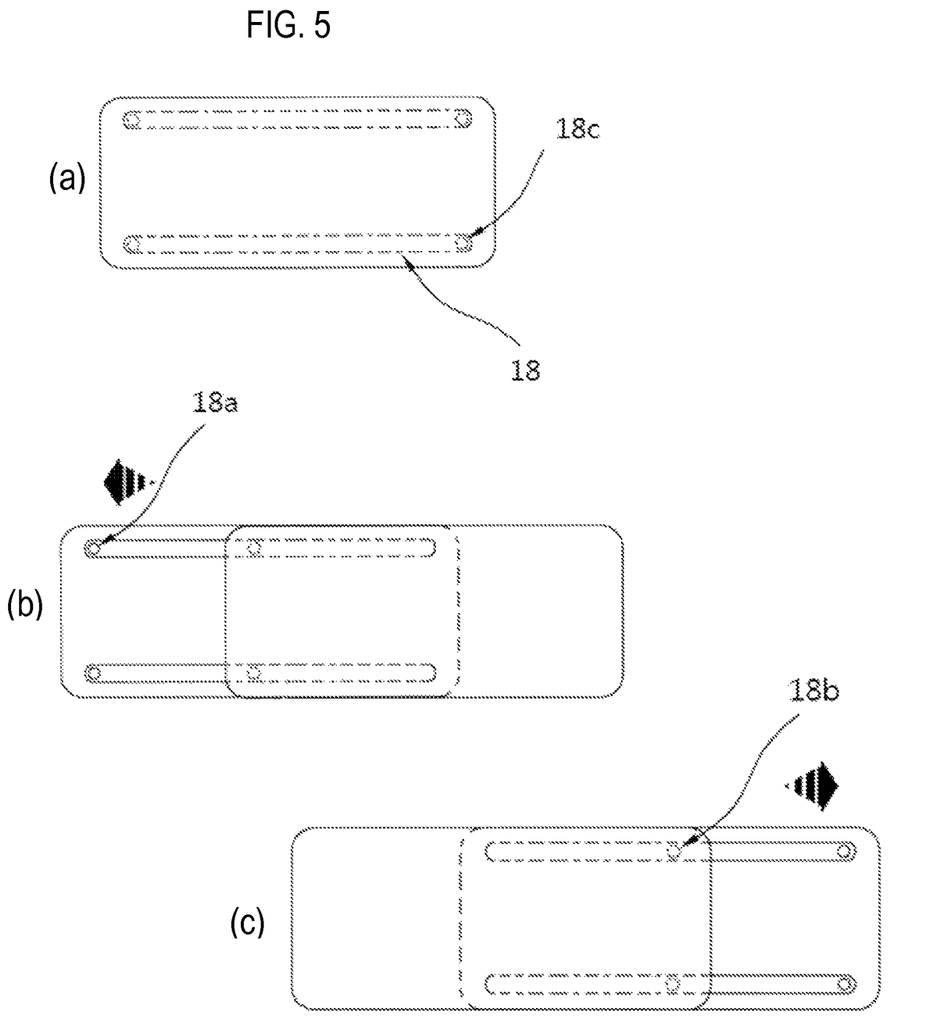
FIG. 5 is a schematic view sequentially showing sliding operations when a slide type mobile communication terminal according to an embodiment of the invention is switched into communication and supplementary function modes from a stand-by mode.

FIG. 1 is a front view of a slide type mobile communication terminal under stand-by mode according to an embodiment of the invention, FIG. 2 is a front view of a slide type mobile communication terminal under communication mode, in which an upper main body of the terminal is slid upward relative to a lower main body according to an embodiment of the invention, FIG. 3 is a front view of a slide type mobile communication terminal under supplementary function mode, in which an upper main body of the terminal is slid downward relative to a lower main body according to an embodiment of the invention, FIG. 4 is a schematic exploded perspective view of a slide type mobile communication terminal according to an embodiment of the invention and FIG. 5 is a schematic view sequentially showing an slide operation when a slide type mobile communication terminal according to an embodiment of the invention is switched into communication and supplementary function modes from a stand-by mode.

Referring to FIGS. 1 to 5, a slide type mobile communication terminal according to an embodiment of the invention comprises an upper main body 10, a lower main body 20 and a slide engagement member 17, 18 connecting the upper and lower main bodies to be slidable upstream and downstream relative to each other.

The upper main body 10 comprises a display section 11 and a first function key pad section on upstream and downstream parts of an upper surface 10a thereof, respectively, and may further comprise an additional function key 15 on a side thereof.

The first function key pad section includes direction keys 13a, a selection key 13b and additional function keys 14a, 14b, 14c, 14d for switching menu, mail, navigation, search, supplementary functions and the like. According to an embodiment of the invention, the first function key pad section can serve as game function keys, i.e., game buttons when the mobile communication terminal of the invention is switched into a game mode.

The lower main body 20 is connected to the upper main body 10 to be slidable upward and downward relative to the upper main body and comprises an input key pad section 21 having a plurality of number buttons and other input keys, and a second function key pad section 23. The lower main body 20 may further comprise an additional function key 22 on a side thereof.

The input key pad section 21 which is provided to a typical mobile communication terminal is used to input a telephone number, a character and the like.

The second function key pad section 23 may comprise direction keys and a selection key and is structured such that a user can easily manipulate supplementary functions using both hands with the display section being located at the middle of the terminal when a supplementary function mode such as game, camera, DMB and the like is selected. According to a preferred embodiment of the invention, the second function key pad section 23 may be used as game function keys under game mode, like the first function key pad section.

According to an embodiment of the invention, the second function key pad section 23 is located at an upstream part of the lower main body opposite to the first function key pad section so that it is exposed to an exterior when the upper main body is slid downstream relative to the lower main body. The second function key pad section is structured as described above, so that when the terminal of the invention is switched into a game mode, a user can use a variety of supplementary functions with an easier interface.

The slide engagement member connecting the upper and lower main bodies to be slidable relative to each other comprises a slide rail 18 provided on a lower surface 10b of the upper main body 10 and extending over about a whole length of an upstream and downstream direction of the upper main body, and slide protrusions 17 located at a middle point of an upstream and downstream direction of an upper surface 20a of the lower main body 20 and inserted into the slide rail 18.

By the slide engagement member, the upper main body 10 can slide upstream and downstream relative to the lower main body 20.

This has such an advantage that it is possible to use upstream and downstream spaces of the lower main body, compared that the prior slide type terminal uses only the downstream space of the lower main body because the upper main body can reciprocally move to the upstream only, relative to the lower main body.

Specifically, according to the invention, since the second function key pad section is provided to the upstream space of the lower main body, contrary to the prior slide type mobile communication terminal, it is possible to use the first and second function key pad sections in the upstream and downstream spaces at the same time with the display section being located at the center. Accordingly, when the supplementary function modes such as game, camera, DMB and the like are selected, a user can manipulate the function keys with both hands while holding both ends of the terminal with both hands and seeing the wide display screen at the same time, under state that the terminal is horizontally arranged. Therefore, when the mobile communication terminal is used as a game machine, very useful functionality and convenience can be secured.

Fixing elements 18a, 18b, 18c for local engagement with the slide protrusion 17 are formed at upstream, middle and downstream portions of the slide rail 18, respectively. Accordingly, when the upper and lower main bodies are slidingly moved relative to each other, the upper and lower main bodies are releasably fixed to each other at positions of the stand-by, communication and supplementary function modes of the terminal. At this time, the slide protrusions 17 are arranged such that the display section 11 is located at the center when the slide protrusions are engaged with the upstream fixing element 18a. Since the slide protrusions 17 are arranged as described above, the upper and lower main bodies are extended upward and downward to the utmost when the terminal is switched into the supplementary mode such as game, so that the user can play a game more conveniently.

Examples of mode switch positions of the terminal as the terminal slides are shown in FIG. 5. An initial position at which the upper and lower main bodies 10, 20 are correspondingly overlapped with each other is a stand-by mode. When the upper main body is slid upstream and downstream relative to the lower main body, the terminal is switched into the communication and supplementary function modes, respectively.

The mode switch may be carried out by, for example, arranging diverse sensors such as position sensor, contact sensor and the like in the main body and detecting a relative position between the upper and lower main bodies. Since these structures have been already known in the art, a detailed description thereof is omitted.

When the supplementary function mode such as game, DMB, camera and the like is selected as the game mode, both the first and second function key pad sections are activated, thereby allowing a user to play a game with the two function key pad sections.

Figure 6:
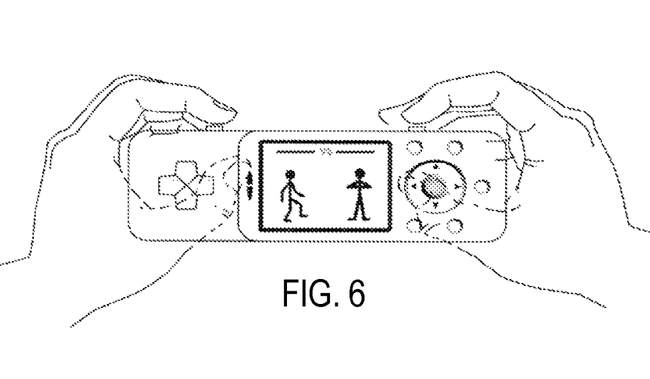
FIG. 6 is an exemplary view illustrating a convenience of a user's grip operation when a slide type mobile communication terminal according to an embodiment of the invention is under game mode.
Figure 7:
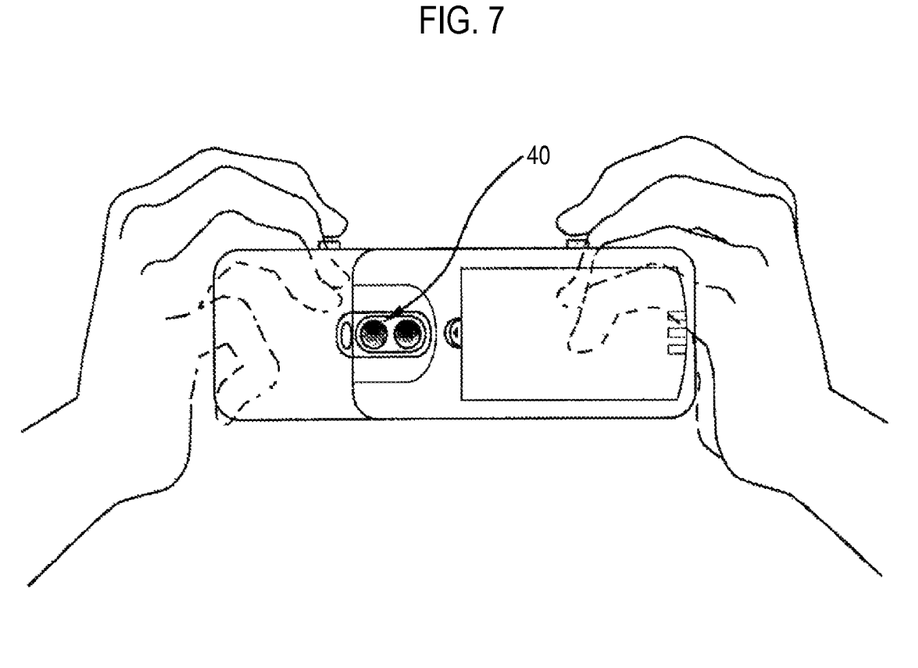
FIG. 7 is an exemplary view illustrating a convenience of a user's grip operation when a slide type mobile communication terminal according to an embodiment of the invention is under camera mode.

FIG. 6 is an exemplary view illustrating a convenience of a user's grip operation when a slide type mobile communication terminal according to an embodiment of the invention is under game mode, and FIG. 7 is an exemplary view illustrating a convenience of a user's grip operation when a slide type mobile communication terminal according to an embodiment of the invention is under camera mode.

As shown in FIGS. 6 and 7, when selecting the supplementary function as described above, the upper main body is slid downward relative to the lower main body and the first and second function key pad sections are located at lower and upper sides with the display section being positioned at the center. Accordingly, a user can arrange the terminal horizontally and hold both ends of the terminal with both hands, so that the user can manipulate the function keys with both hands while seeing the display screen. In addition, according to an embodiment of the invention, the upper main body 10 and the lower main body 20 are provided with additional function keys 15, 22. The user can use the additional function keys as game option keys and thus play a game in more diverse manners.

The display section is switched into a horizontal wide screen when the supplementary function mode is selected.

A digital camera module section 30 may be mounted to the upstream space of the lower main body 20. Alternatively, the camera module section may be mounted to the upstream space of the upper main body 10.

While the invention has been shown and described with reference to certain preferred embodiments thereof, it will be understood by those skilled in the art that various changes in form and details may be made thereto without departing from the spirit and scope of the invention as defined by the appended claims. For example, although the slide engagement member has been described and shown that the slide rail is provided to the upper main body and the slide protrusion is provided to the lower main body, an reverse arrangement is possible and shapes and number thereof may be also modified.

The invention claimed is:

1. A slide type mobile communication terminal comprising:
    a lower body comprising an input number key pad section and a second function key pad section; and
    an upper body comprising a display window and a first function key pad section;
    wherein the upper body is disposed entirely above the lower body and is slidably engaged to the lower body allowing the upper body to slide upward and downward from the lower body,
    sliding the upper body upward exposes a lower portion of the lower body having the input number key pad section, and
    sliding the upper body downward exposes an upper portion of the lower body having the second function key pad section, so that the display window is located between the first function key pad section and the second function key pad section.

2. The terminal in accordance with claim 1, wherein the first and second function key pad sections are provided on both opposite sides of the display window when the upper body slides downward and the input number key pad section is covered by the upper body.

3. The terminal in accordance with claim 1, wherein the display window on the upper body approximately is positioned at a center of the terminal when the upper body slides downward from the lower body.

4. The terminal in accordance with claim 1, wherein the second function key pad section on the lower body and the first function key pad on the upper body are symmetrically positioned centering around the display window to be controlled by both hands when the upper body slides downward from the lower body.

5. The terminal in accordance with claim 1, wherein the upper body slides downward from the lower body to provide an additional function for the terminal via the first and second key pad sections.

6. The terminal in accordance with claim 1, wherein a picture of the display window is switched into a horizontally wide picture from a vertically wide picture when the upper body slides downward from the lower body.

7. A slide type mobile communication terminal includes first and second bodies each of which has the same size, the terminal comprising:

a bidirectional sliding structure comprising a first body and a second body, the first body comprising a main input key pad and a first additional key pad, and the second body comprising a second additional key pad and a display window, wherein the bidirectional sliding structure provides first and second sliding directions and the second body is disposed entirely above the first body and slides on the first body according to the first or second sliding direction, sliding the second body in the first sliding direction exposes a lower portion of the first body having the main input key pad and covers the first additional key pad, and sliding the second body in the second sliding direction exposes an upper portion of the first body having the first additional key pad, so that the display window is located between the first additional key pad section and the second additional key pad section and the first and second additional key pad sections are simultaneously operable as input devices.

8. The terminal in accordance with claim 7, wherein a picture of the display window is switched from a vertical direction to a horizontal direction with respect to the second sliding direction when the second body slides in the second sliding direction.

* * * * *